US008409062B2

(12) United States Patent
Benz et al.

(10) Patent No.: US 8,409,062 B2
(45) Date of Patent: Apr. 2, 2013

(54) MACHINE TOOL

(75) Inventors: Winfried Benz, Neenstetten (DE); Stefan Niethammer, Schemmerhofen (DE); Bernd Schröter, Sulmingen (DE); Gerald Stengele, Ludwigsburg (DE); Thomas Weinbuch, Laupheim (DE)

(73) Assignee: Licon MT GmbH & Co. KG, Laupheim (DE)

( * ) Notice: Subject to any disclaimer, the term of this patent is extended or adjusted under 35 U.S.C. 154(b) by 583 days.

(21) Appl. No.: 12/678,222

(22) PCT Filed: Aug. 7, 2008

(86) PCT No.: PCT/EP2008/006475
§ 371 (c)(1),
(2), (4) Date: Mar. 15, 2010

(87) PCT Pub. No.: WO2009/036843
PCT Pub. Date: Mar. 26, 2009

(65) Prior Publication Data
US 2010/0205800 A1    Aug. 19, 2010

(30) Foreign Application Priority Data

Sep. 14, 2007  (DE) .......................... 10 2007 043 977

(51) Int. Cl.
*B23Q 3/157*  (2006.01)
*B23Q 5/40*  (2006.01)
*B23C 1/04*  (2006.01)
*B23C 1/14*  (2006.01)

(52) U.S. Cl. .............. 483/37; 483/44; 483/57; 409/168; 409/190; 409/192; 409/224; 409/235

(58) Field of Classification Search ................... 483/37, 483/38, 39, 44, 48, 49, 51, 52, 57; 409/202, 409/212, 168, 167, 224, 221, 235, 192, 203, 409/213, 217, 190–191; 408/42, 46, 53
See application file for complete search history.

(56) References Cited

U.S. PATENT DOCUMENTS 3,344,512 A * 10/1967 Zucchellini ..................... 483/62
3,545,075 A * 12/1970 Ollearo ........................... 483/39
4,312,110 A * 1/1982 Averyanov et al. ............. 483/14
(Continued)

FOREIGN PATENT DOCUMENTS

DE  4020997 A1  1/1992
EP  0307830 A2  3/1989
(Continued)

OTHER PUBLICATIONS

Miksch Gmbh, brochure "Kurvengesteuertes Werkzeugwechselsystem (Cam-controlled tool change system)," 2000.

*Primary Examiner* — Erica E Cadugan
(74) *Attorney, Agent, or Firm* — Browdy and Neimark, PLLC

(57) ABSTRACT

A machine tool has, on a machine bed, two stands which can be moved in the horizontal x- and z-direction, on which y-slides carrying tool spindles can be vertically moved. Arranged on one of the stands directly above a bridge projecting over its upper side is at least one tool magazine, with which a tool changer is associated for each stand. The drives for the y-slides are attached below the upper side of the stands to the stands.

6 Claims, 8 Drawing Sheets

U.S. PATENT DOCUMENTS

| | | |
|---|---|---|
| 4,911,589 A | 3/1990 | Winkler et al. |
| 5,131,136 A * | 7/1992 | Uchida et al. ............... 483/5 |
| 5,871,426 A | 2/1999 | Araki et al. |
| 6,066,078 A | 5/2000 | Koelblin et al. |
| 6,394,892 B2 * | 5/2002 | Hanisch et al. ............ 451/259 |
| 6,865,788 B2 | 3/2005 | Pasquetto |
| 2002/0009343 A1 | 1/2002 | Uetake et al. |
| 2006/0189464 A1 * | 8/2006 | Corbean et al. ............. 483/63 |
| 2009/0053004 A1 * | 2/2009 | Yamaura et al. ............ 409/165 |
| 2012/0245005 A1 * | 9/2012 | Sharma et al. ................. 483/1 |

FOREIGN PATENT DOCUMENTS

| | | |
|---|---|---|
| EP | 0985489 A2 | 3/2000 |
| EP | 1285721 B1 | 3/2005 |
| GB | 2167325 A * | 5/1986 |

* cited by examiner

MACHINE TOOL

FIELD OF THE INVENTION

The invention relates to a machine tool.

BACKGROUND OF THE INVENTION

Machine tools are generally known in practice, and specifically so-called travelling stand machines, which have a machine bed, on which an x-slide is displaceably arranged on x-guide rails. Arranged on the x-slide are z-guide rails extending in the z-direction, on which a z-slide is displaceably guided. The x-slide and the z-slide thus form a cross-slide. A stand, on the front side of which, facing a working chamber, a y-slide is vertically displaceably arranged on vertical y-guide rails, is arranged on the z-slide. A tool spindle which is non-displaceable in the z-direction relative to the y-slide, is rotationally drivable, extends in the z-direction and carries a tool holder on its end facing the working chamber, is attached to the y-slide. A workpiece holder is located in front of the spindle in the working chamber. The movements of the tool spindle and therefore of the tool held in the tool holder in the horizontal x- and z-directions take place due to corresponding displacement movements of the cross-slide with the stand. The vertical displacement movements take place by means of the y-slide. In these known machines, a tool magazine with a tool changer is located on one side of the stand, so access to the working chamber from the corresponding side is impaired; it is, however, sufficient that access to the working chamber between the stand and workpiece holder is possible from the opposing side.

It has already become known to arrange two stands that are coupled to one another on a machine bed. This leads to precision problems during machining because of heat expansions within the machine.

A machine tool is known from EP 1 285 721 B1, which, on a machine bed, has a pair of x-guide rails running in the x-direction, on which x-slides configured as stands are displaceably arranged. Each x-slide has, on its front side facing the working chamber, a vertically displaceable y-slide, on which a z-slide carrying a tool spindle is in turn arranged, so the tool spindle with a front tool holder can be displaced in the z-direction. Arranged above the upper sides of the x-slides configured as stands is a bridge, on which a tool magazine is arranged. The x-slides are constantly arranged below the bridge. The y-slides, on their front side, carry tool changers, which are moved upward for the tool change with the y-slide and the z-slide. As each z-slide has a quill-like configuration, the known machine tool is not intrinsically rigid. The problems outlined at the outset cannot be eliminated with this machine tool.

SUMMARY OF THE INVENTION

The invention is therefore based on the object of providing a machine tool of the type mentioned at the outset, which, with high efficiency, has a high degree of flexibility and high precision with a simple structure.

This object is achieved by a machine tool with a machine bed, with a pair of x-guide rails arranged on the machine bed and extending in a horizontal x-direction, with two x-slides displaceably arranged in the x-direction on the x-guide slides, with a respective z-slide arranged on each x-slide and displaceable in a horizontal z-direction extending perpendicular to the horizontal x-direction, with a respective stand arranged on each z-slide with an upper side and a front side, with a respective y-slide arranged on each front side and displaceably arranged in a vertical y-direction extending perpendicular to the x-direction and to the z-direction up to close to the upper side, which slide can be driven by means of a y-drive motor arranged below the respective upper side, with a respective tool spindle which is arranged on each y-slide, which can be driven rotationally and extends in the z-direction and is non-displaceable relative to the y-slide in the z-direction and has a tool holder at an end located in front of the front side, with a working chamber arranged in front of the front sides, with a workpiece carrier arranged in the working chamber on the machine bed, with at least one respective workpiece holder associated with each stand and arranged on the workpiece carrier, with a bridge provided directly above the upper side of each stand, with at least one tool magazine arranged directly above the upper sides of the stands on the bridge and with a respective tool changer provided on the bridge to transfer tools from the tool magazine to the tool holder and vice versa, the respective stand being movable below the tool magazine for the tool change in such a way that the respective tool holder is located below the respective tool changer.

Since the x-drives of the two stands are independent of one another, relative movements of the stands with respect to one another caused by temperature can easily be compensated. Furthermore, a compensation of different expansions in the z- and y-direction can also be carried out at each stand. The working chamber remains freely accessible from both sides because of the arrangement of the tool magazine directly above the upper side of each stand and due to the transferring associated with this of the y-drive motor below the upper side of the stand. The same working processes can basically be carried out in parallel with the two tool spindles. Theoretically, however, different working processes can also be carried out. Since the tool spindle can be displaced close to the upper side of the stand, a simple tool change is possible by means of a pivoting changer.

Further advantages, features and details of the invention emerge from the following description of an embodiment of the invention with the aid of the drawings.

DESCRIPTION OF THE PREFERRED EMBODIMENT

Figure 5:
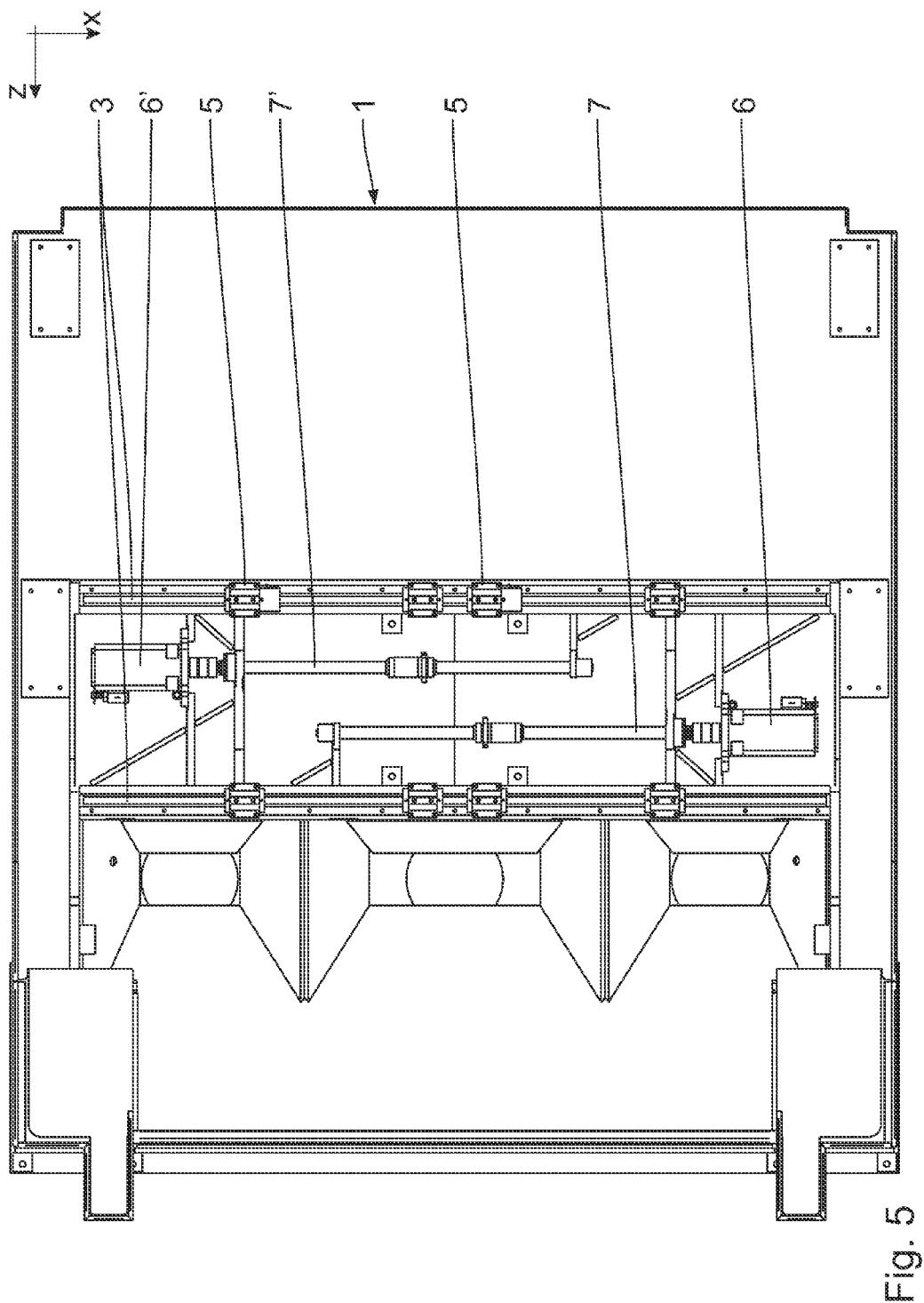
FIG. 5 shows a plan view of the machine bed of the machine tool.
Figure 6:
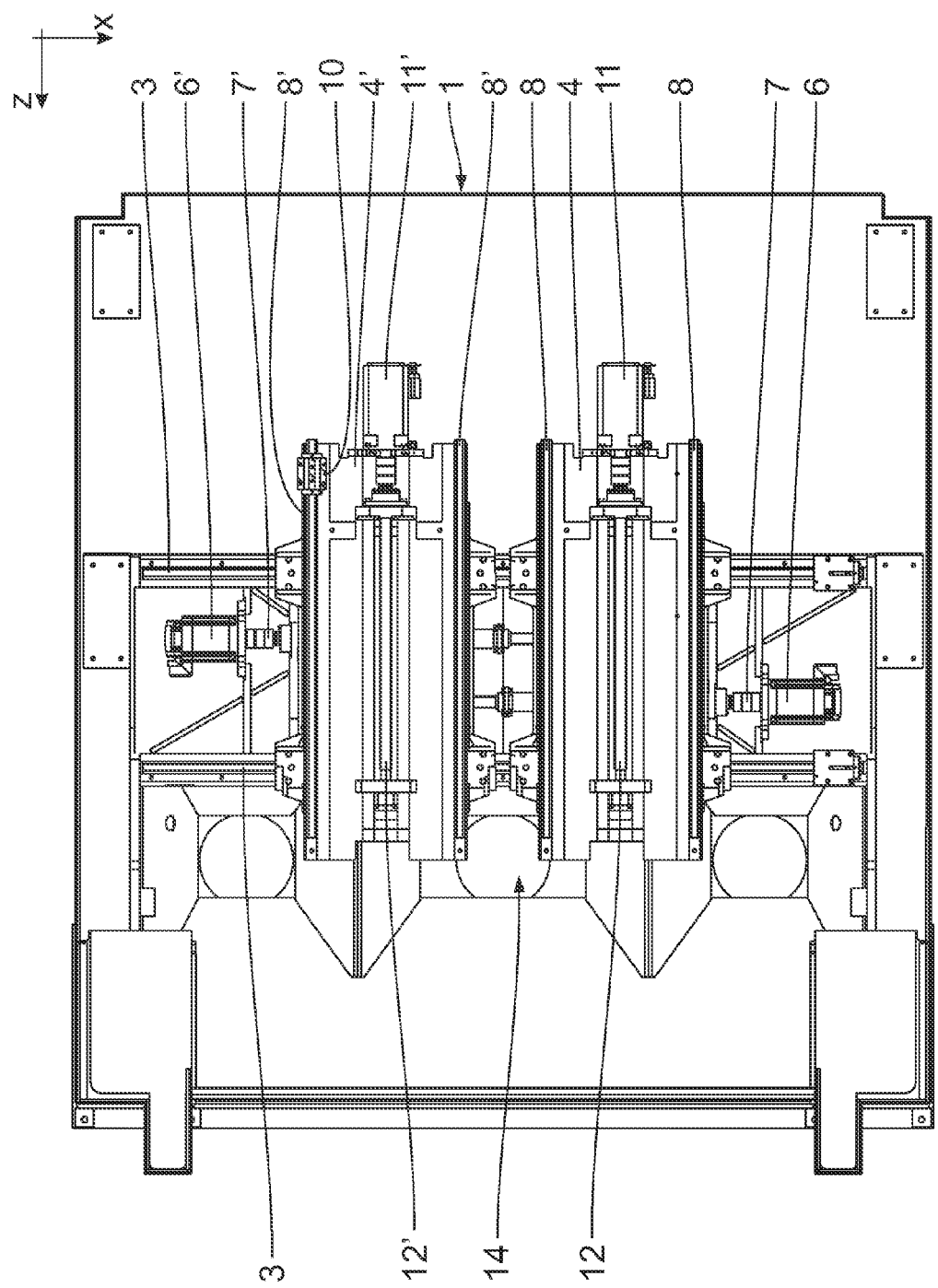
FIG. 6 shows a plan view of the machine bed of the machine tool with the x-slide placed on, FIG. 7 shows a plan view of the machine tool without a bridge with tool magazines and tool changers
Figure 7:
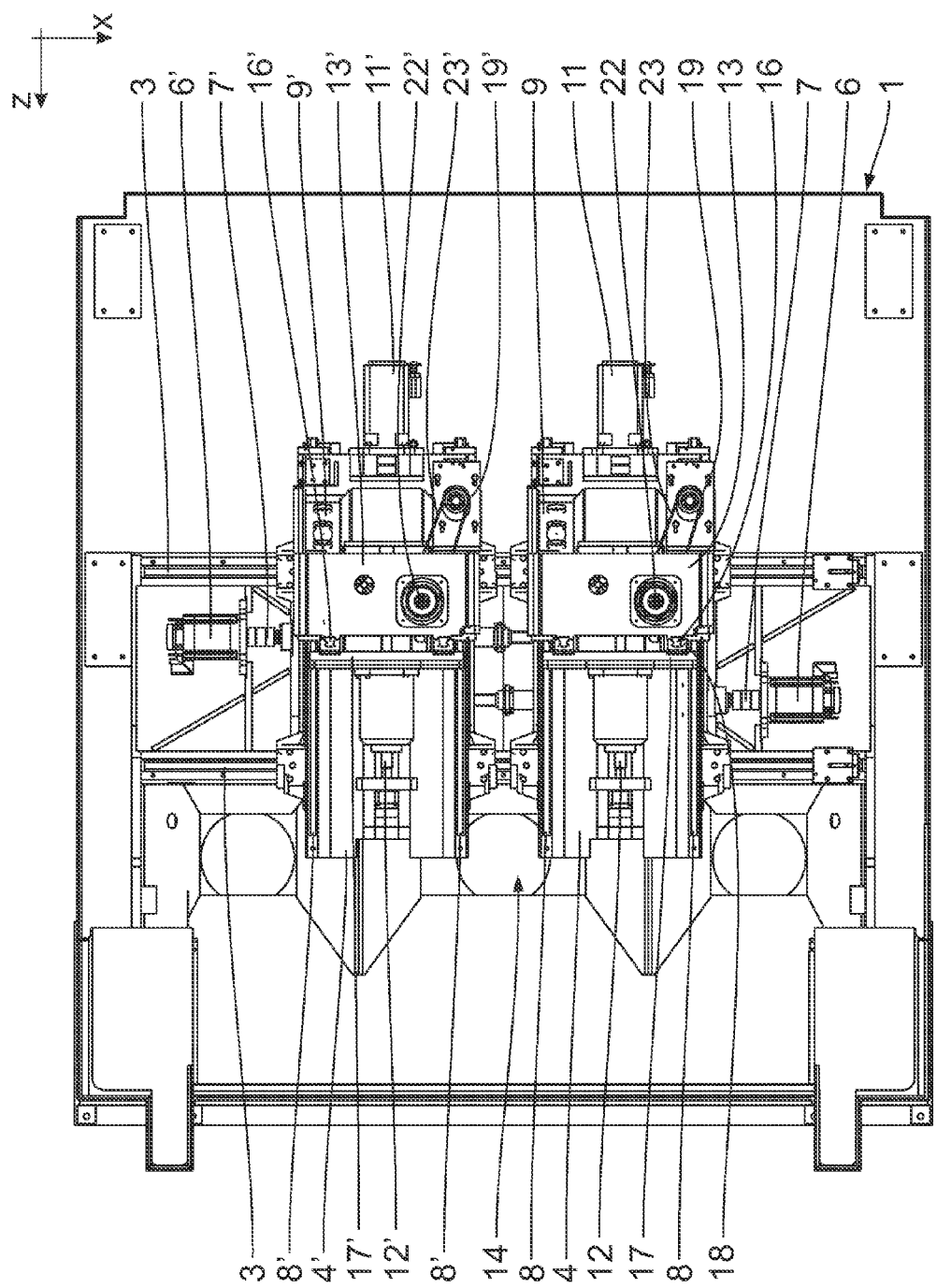

As the drawing shows, the machine tool shown there, which is a milling machine, has a machine bed 1, which is supported on the base 2. A pair of x-guide rails 3, arranged parallel to one another, on which two x-slides 4, 4', which are independent of one another, in other words not connected to one another, are displaceably arranged independently of one another in a horizontal x-direction, is attached to the machine bed 1. Each x-slide 4, 4' is supported for this purpose on the x-guide rails 3 by means of four guide shoes 5. Each slide is driven by an x-drive motor 6 or 6' by an x-spindle spindle nut drive 7, 7'. The x-drive motors 6, 6' are attached opposing one another on the machine bed 1, as can be inferred from FIG. 5. Attached to each x-slide 4, 4' is a pair of z-guide rails 8, 8', on which a z-slide 9, 9' is supported in each case by means of guide shoes 10 and is displaceably arranged in a horizontal z-direction. The z-direction extends perpendicular to the x-direction. Each z-slide 9, 9' can also be driven by a z-spindle spindle nut drive 12, 12' in the z-direction by means of a z-drive motor 11 or 11'. The x-slides 4, 4' and the z-slides 9, 9', in each case form a cross-slide.

Figure 8:
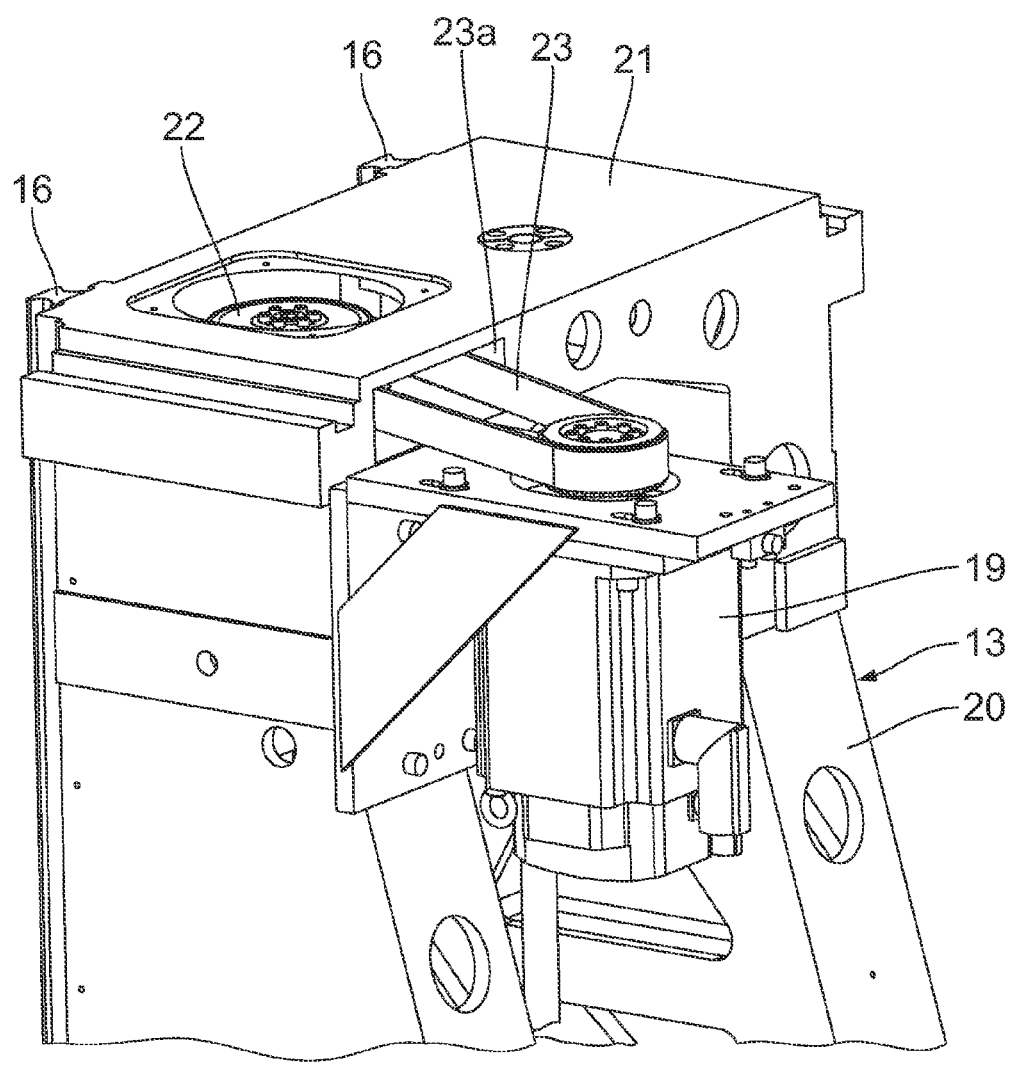
FIG. 8 shows a perspective part view of a stand of the machine tool.

A stand 13, 13' is connected to the z-slide 9, 9' in each case. Attached to its respective front side 15, 15' facing a common, working chamber 14, of each stand 13, 13' is a pair of mutually parallel y-guide rails 16, 16', on which, in each case, a y-slide 17, 17' is displaceably guided by means of guide shoes 18 in a vertical y-direction perpendicular to the x- and z-direction. The drive takes place in each case by means of a y-drive motor 19, 19', which is arranged on the rear side 20, 20' of the respective stand 13, 13' remote from the working chamber 14 and the respective front side 15, 15', specifically below the respective upper side 21, 21' of the stand 13, 13'. The drive of the y-spindle spindle nut drive 22, 22' also present here in each case does not take place directly from the respective y-drive motor 19, 19' as in the x-slides 4, 4' and the z-slides 9, 9' but by means of a belt drive 23, 23', so the y-slides 17, 17' are free of impediments in the region of their upper side 21, 21'. As can be inferred from FIG. 8, the belt drive 23 passes through an opening 23a in the rear side 20 of the stand 13, which is closed toward the upper side 21 of the stand 13, so the stability of the stand is not impaired.

Each y-slide 17, 17', in its upper region, carries a tool spindle 24, 24', which can be rotationally driven by a motor 25, 25'. At its front end facing the working chamber 14, each tool spindle 24, 24' is provided with a tool holder 26, 26'. The tool spindles 24, 24' extend in the z-direction and are non-displaceable relative to the y-slide 17, 17' carrying them in each case in the z-direction.

Provided in the working chamber 14, in other words in the z-direction in front of the stands 13, 13' and the tool spindles 24, 24', is a workpiece holder 27 in the form of a bridge, which is pivotable about an A-axis 28 parallel to the x-direction by means of a pivoting motor 29. Arranged on the workpiece holder 27 is a plurality of, in the present case four, workpiece holders 30, which may be pivotable about a B-axis 31 extending perpendicular to the A-axis 28.

A support frame 32 is attached to the machine bed 1 and directly above the upper sides 21, 21' of the stands 13, 13' has a bridge 33, on which two tool magazines 34, 34' are arranged, which are configured as a disc magazine and can be rotatably driven by means of a motor 36 in each case about an axis 35, 35' which is vertical, in other words parallel to the y-direction. The tool magazines 34, 34' may receive a relatively large number of tools 37, 37', of which only two are shown in each case, close to their periphery.

On the end face 38 of the bridge 33 facing the working chamber 14, a tool changer 39, 39' is arranged in front of each tool magazine 34, 34'. These tool changers are generally known. They have a change arm 41, which can be pivoted about a horizontal pivot axis 40 extending in the z-direction, and which carries a respective tool gripper 42 at its two ends. Located below the respective disc-shaped tool magazine 34 or 34' is a support 43, in which a tool 37 or 37' from a tool magazine 34 or 34' can be placed, wherein it is transferred from the vertical position in the tool magazine 34, 34' into a horizontal position. For return transport from this support 43 into the tool magazine 34 or 34', the tool 37 or 37' is pivoted up again. Tool magazines 34, 34' of this type and the tool changers 39, 39' are commercially conventional and generally known, for example from the brochure "Kurvengesteuertes Werkzeugwechselsystem" (Cam-controlled tool change system) from MIKSCH GMBH, 73037Göppingen, Germany, publication No. M288DD/0605. A device is also known from this for the transfer mentioned of a tool 37, 37' from the tool magazine 34 or 34' into the support 43 and vice versa. The change arm 41 can be displaced in the direction of the pivot axis 40.

Figure 1:
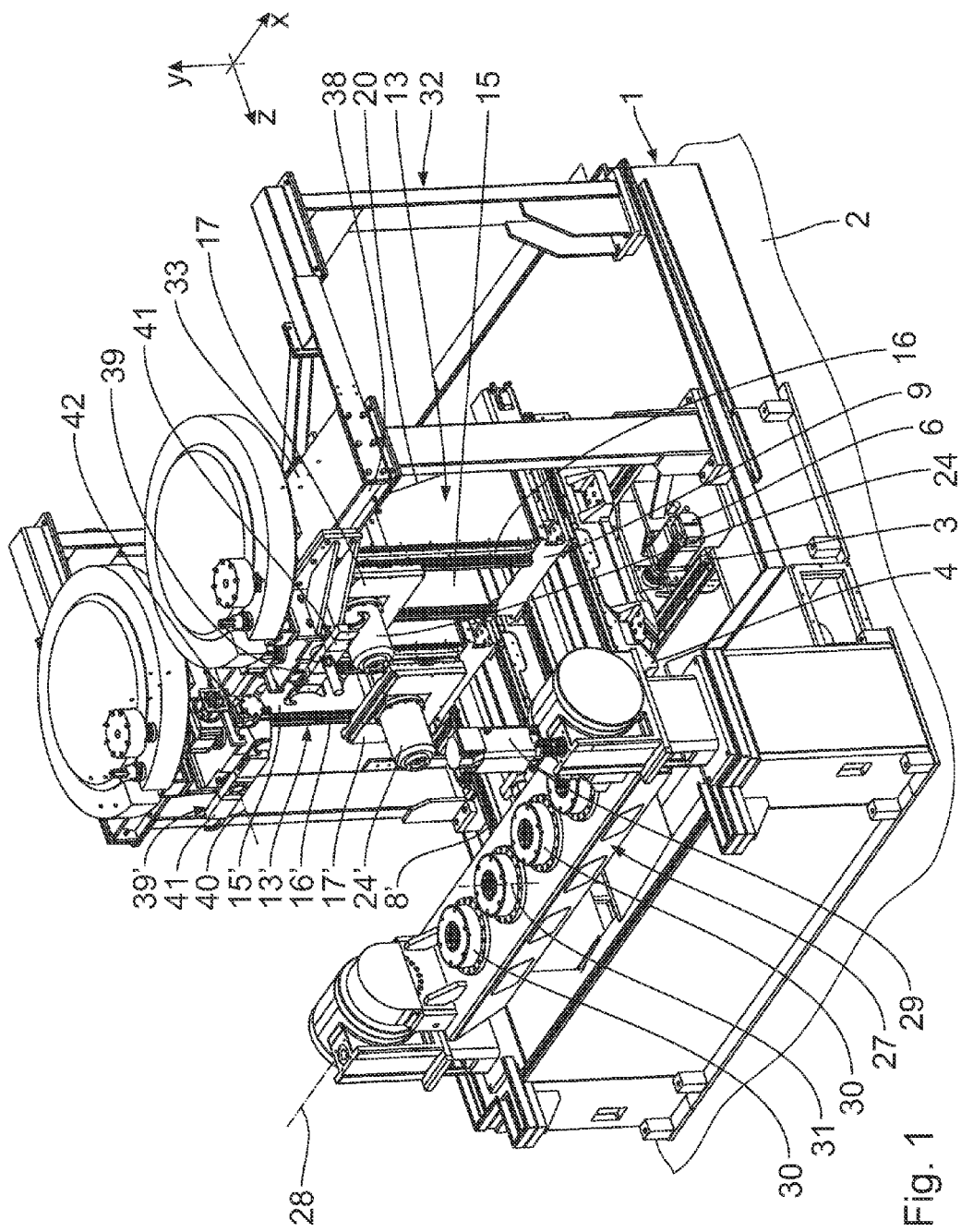
FIG. 1 shows a perspective view of a machine tool according to the invention.
Figure 2:
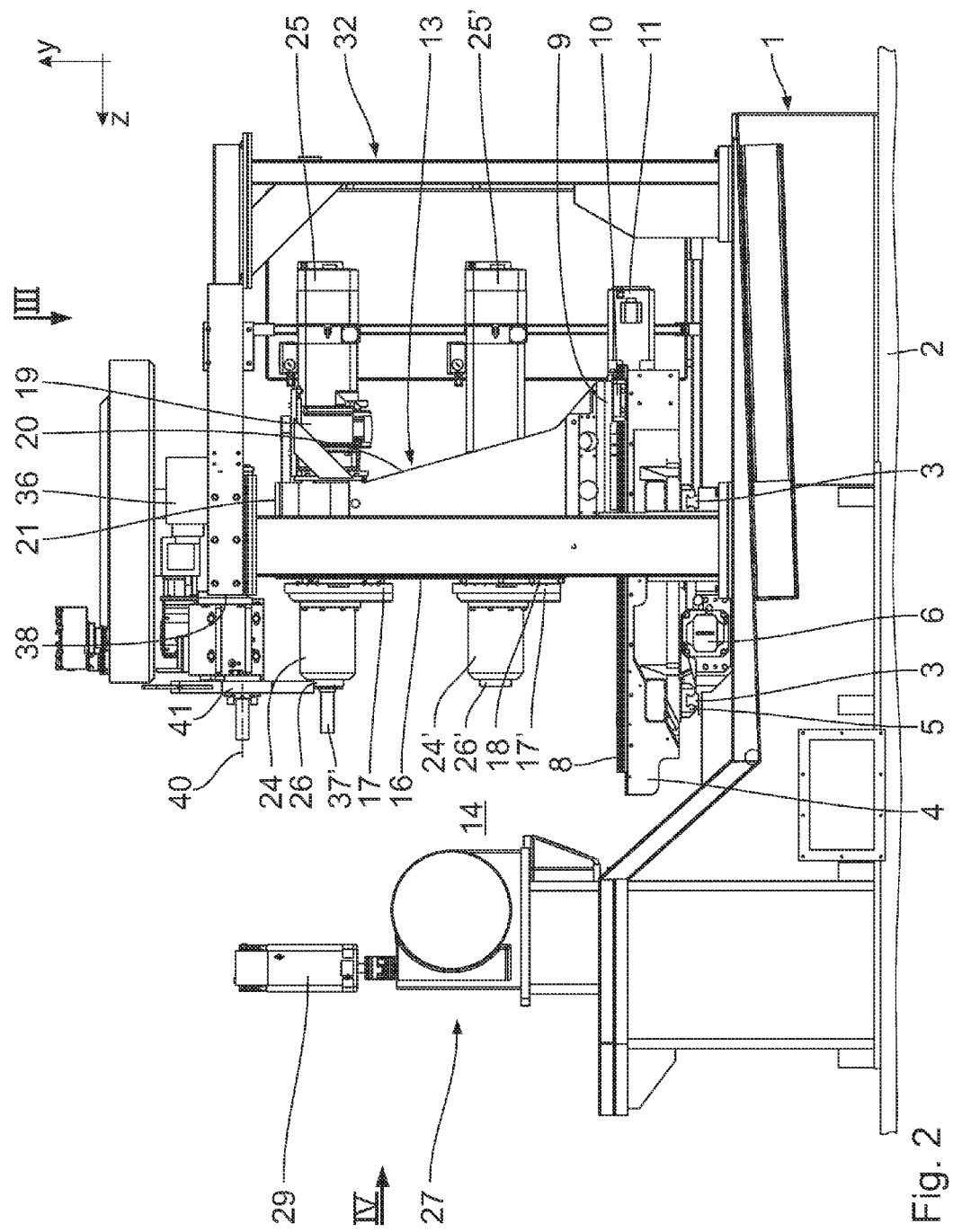
FIG. 2 shows a side view of the machine tool in accordance with the viewing arrow II in FIGS. 3 and 4.
Figure 3:
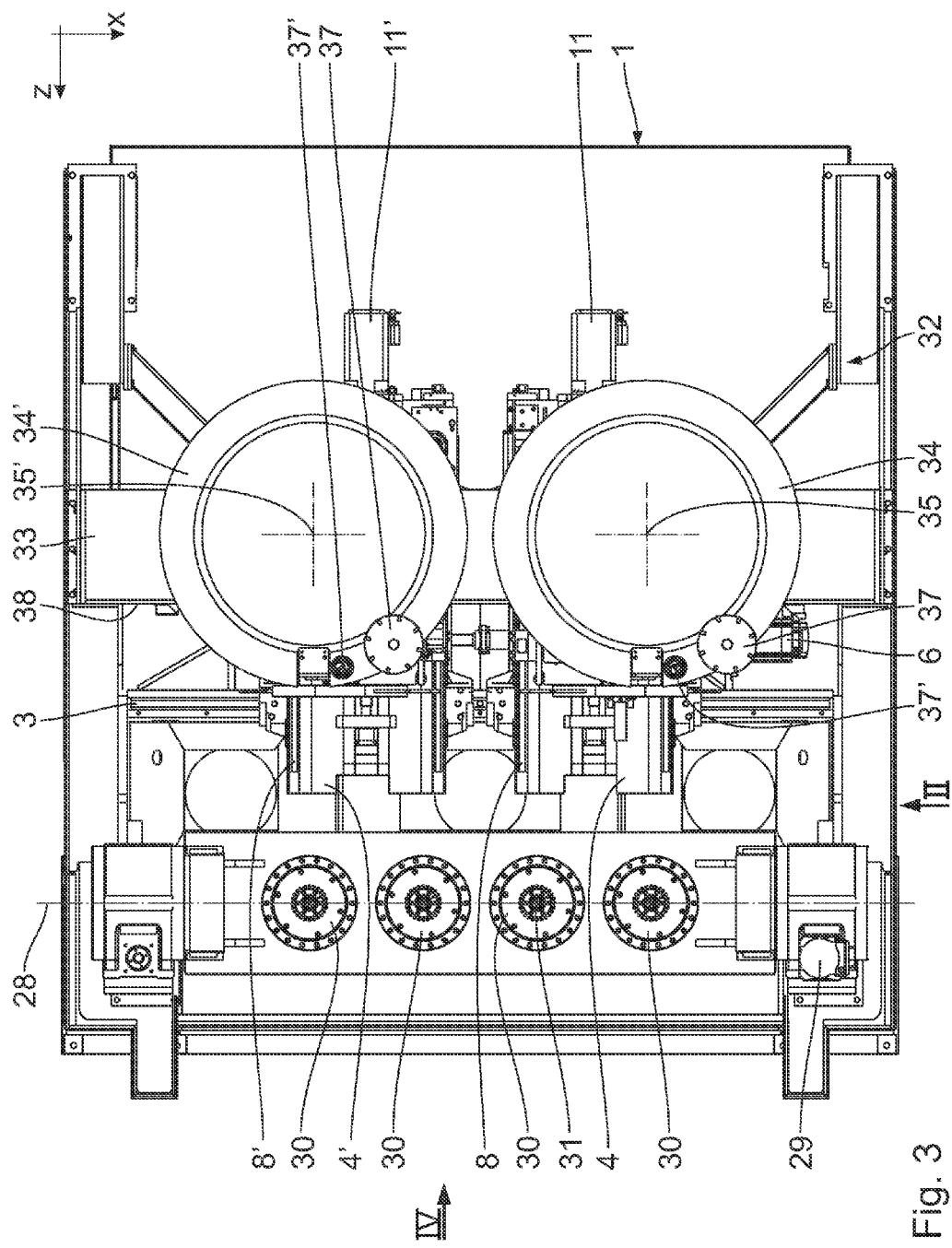
FIG. 3 shows a plan view of machine tool according to the viewing arrow III in FIGS. 2 and 4.
Figure 4:
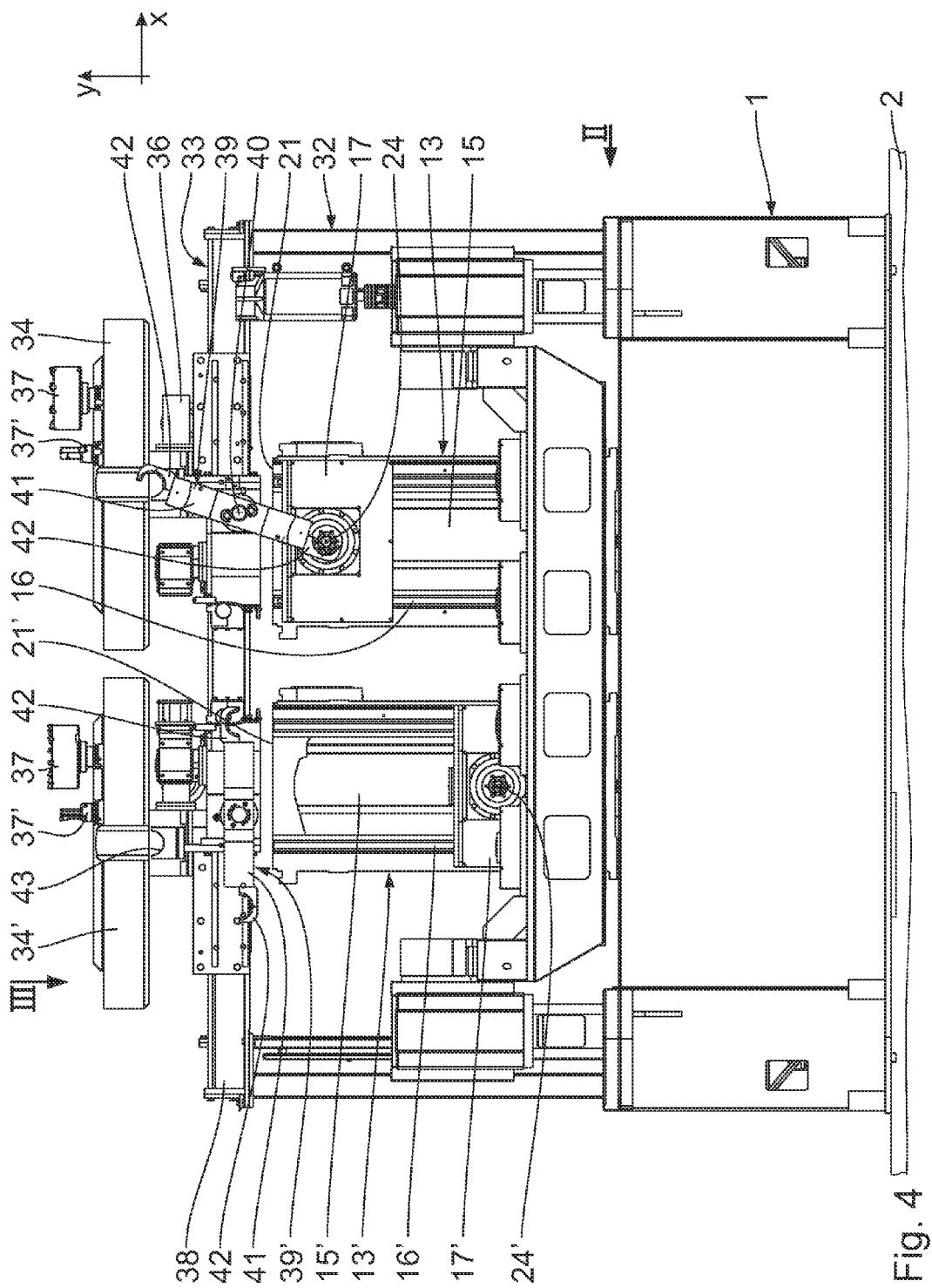
FIG. 4 shows a front view of the machine tool in accordance with the viewing arrow IV in FIGS. 2 and 3.

The tool changer 39 or 39' is located—if no tool change is taking place—in a horizontal rest position shown on the left in FIG. 4 in front of the end face 38 of the bridge 33. For the tool change, the respective stands 13 or 13' moves into the rear position shown in FIG. 2, in which the tool holder 26 or 26' of the respective tool spindle 24 or 24' is located below the respective tool changer 39 or 39'. The tool spindle 24 or 24' in which the tool to be changed is located, is brought by corresponding movement of the respective y-slide 17 or 17' into its uppermost position directly adjacent to the upper side 21 or 21' of the respective stand 13 or 13', so the tool gripper 42 of the change arm 41 can in each case be brought in front of the tool holder 26 or 26' and only specifically by pivoting about the pivot axis 40. The change arm 41 is then pivoted into the right-hand position in FIG. 4, in which a tool located in the tool holder 26 or 26' engages by means of one tool gripper 42. It grips, with the other tool gripper 42, a tool 37 or 37' lying horizontally located in front of the respective tool magazine 34 or 34' in a support 43. The change arm 41 with the two tools 37 or 37' is then moved away from the bridge 33, in other words in the z-direction toward the workpiece carrier 27, so the tool located in the tool holder 26 or 26' is removed therefrom. Thereafter, the change arm is rotated through 180° about its pivot axis 40 and moved back again in the z-direction, so a new tool 37 or 37' is inserted in the tool holder 26 or 26' and the tool 37 or 37' no longer required is pushed into the associated magazine 34 or 34'. The change arm 41 is then pivoted back into its rest position already mentioned.

Instead of the tool magazine described configured as a disc magazine, a common magazine, for example a chain magazine may also be provided for the two stands 13, 13', as a tool magazine, which would be arranged on the support frame 32.

The invention claimed is:
1. A machine tool,
with a machine bed (1),
with a pair of x-guide rails (3) arranged on the machine bed (1) and extending in a horizontal x-direction,
with two x-slides (4, 4') displaceably arranged for displacement in the x-direction on the x-guide rails (3),
with a respective z-slide (9, 9') arranged on each x-slide (4, 4') and displaceable in a horizontal z-direction extending perpendicular to the horizontal x-direction,
with a respective stand (13, 13') arranged on each z-slide (9, 9') with an upper side (21, 21') and a front side (15, 15'),
with a respective y-slide (17, 17') arranged on each front side (15, 15') and displaceably arranged for displacement in a vertical y-direction extending perpendicular to the x-direction and to the z-direction up to close to the upper side (21, 21'), wherein each y-slide (17, 17') is displaceable by means of a respective y-spindle spindle nut drive (22, 22') and wherein each of the y-spindle spindle nut drives (22, 22') is rotationally drivable by means of a respective y-drive motor (19, 19'), which is arranged on the respective stand (13, 13') below the respective upper side (21, 21') thereof, with a respective tool spindle (24, 24') which is arranged on each y-slide (17, 17'), which each tool spindle is rotationally drivable about a respective rotation axis that extends in the z-direction, is non-displaceable relative to the respective y-slide (17, 17') in the z-direction and has a tool holder (26, 26') at an end of the respective tool spindle that is located in front of the respective front side (15, 15'), with a working chamber (14) arranged in front of the front sides (15, 15'), with a workpiece carrier (27) arranged in the working chamber (14) on the machine bed (1), with at least one respective workpiece holder (30) associated with each stand (13, 13') and arranged on the workpiece carrier (27), with a common bridge (33) provided directly above the upper side (21, 21') of each stand (13, 13'), with at least one tool magazine (34, 34') arranged directly above the upper sides (21, 21') of the stands (13, 13') on the bridge (33) and with a respective tool changer (39, 39') provided on the bridge (33) to transfer tools (37, 37') from the at least one tool magazine (34, 34') to the respective tool holder (26, 26') and vice versa, the respective stand (13, 13') being movable below the at least one tool magazine (34, 34') for the tool change in such a way that the respective tool holder (26, 26') is located below the respective tool changer (39, 39').

2. A machine tool according to claim 1, wherein each of the tool changers (39, 39') has a change arm (41) which is pivotable about a respective pivot axis (40) extending in the z-direction and which each change arm is provided at each of its two ends with a tool gripper (42), and wherein each of the y-slides (17, 17') is movable in the y-direction towards the respective upper side (21, 21') of the respective stand (13, 13') to such an extent that one of the tool grippers (42) is drivable in front of the respective tool holder (26, 26').

3. A machine tool according to claim 1, wherein the at least one tool magazine comprises two tool magazines (34, 34'), each of which is arranged directly above a respective one of the upper sides (21, 21') of a respective one of the stands (13, 13').

4. A machine tool according to claim 1, wherein each of the y-drive motors (19, 19') is coupled to a respective one of the y-spindle spindle nut drives (22, 22') by means of a respective belt drive (23, 23').

5. A machine tool according to claim 4, wherein each of the belt drives (23, 23') passes through a respective opening (23*a*) in a respective one of the stands (13, 13').

6. A machine tool according to claim 5, wherein each of the openings (23*a*) is configured in a respective rear side (20) of a respective one of the stands (13).

* * * * *